US009349176B2

(12) United States Patent
Yang et al.

(10) Patent No.: US 9,349,176 B2
(45) Date of Patent: May 24, 2016

(54) COMPUTER-AIDED DETECTION (CAD) OF INTRACRANIAL ANEURYSMS (75) Inventors: Xiaojiang Yang, Rochester, MN (US); Bradley J. Erickson, Rochester, MN (US); Daniel J. Blezek, Mantorville, MN (US); David F. Kallmes, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 979 days.

(21) Appl. No.: 13/382,460

(22) PCT Filed: Jul. 15, 2010

(86) PCT No.: PCT/US2010/042055
§ 371 (c)(1),
(2), (4) Date: Apr. 24, 2012

(87) PCT Pub. No.: WO2011/008906
PCT Pub. Date: Jan. 20, 2011

(65) Prior Publication Data
US 2012/0201446 A1    Aug. 9, 2012

Related U.S. Application Data (60) Provisional application No. 61/225,701, filed on Jul. 15, 2009.

(51) Int. Cl.
*G06K 9/00*    (2006.01)
*G06T 7/00*    (2006.01)

(52) U.S. Cl.
CPC ..... *G06T 7/0012* (2013.01); *G06T 2207/10072* (2013.01); *G06T 2207/20101* (2013.01); *G06T 2207/30101* (2013.01)

(58) Field of Classification Search
None
See application file for complete search history.

(56) References Cited

U.S. PATENT DOCUMENTS

| 6,134,353 | A | 10/2000 | Makram-Ebeid |
| 6,408,202 | B1 * | 6/2002 | Lima ............... G01R 33/34 324/307 |
| 6,438,403 | B1 * | 8/2002 | Cline et al. ............... 600/410 |
| 6,662,038 | B2 * | 12/2003 | Prince ............... 600/420 |
| 7,864,997 | B2 * | 1/2011 | Aben ............... 382/128 |
| 7,899,231 | B2 * | 3/2011 | Novak ............... 382/131 |
| 7,903,856 | B2 * | 3/2011 | Pfister et al. ............... 382/128 |
| 8,116,542 | B2 * | 2/2012 | Avinash et al. ............... 382/128 |
| 8,165,385 | B2 * | 4/2012 | Reeves et al. ............... 382/154 |
| 8,249,815 | B2 * | 8/2012 | Taylor ............... 702/19 |
| 8,548,778 | B1 * | 10/2013 | Hart et al. ............... 703/6 |
| 8,781,194 | B2 | 7/2014 | Malek et al. |

(Continued)

OTHER PUBLICATIONS

Liu et al. "Increased Expression of Vascular Endothelial Growth Factor in Kidney Leads to Progressive Impairment of Glomeular Functions" Journal Am Soc Nephrol 18: 2094-2104 (2007).*

(Continued)

*Primary Examiner* — Stephen R Koziol
*Assistant Examiner* — Mia M Thomas
(74) *Attorney, Agent, or Firm* — Shumaker & Sieffert, P.A.

(57) ABSTRACT

A computer-aided system identifies aneurysm suspects in 3D image datasets. The system takes the raw image dataset as input and assigns one or more points of interest (POIs) in the image data. The system determines one or more features for each POI and identifies one or more aneurysm suspects from among the assigned POIs based on the determined features.

18 Claims, 6 Drawing Sheets

(56) References Cited

U.S. PATENT DOCUMENTS

| | | | |
|---|---|---|---|
| 8,818,061 B2* | 8/2014 | Ohlson | 382/128 |
| 2002/0090121 A1* | 7/2002 | Schneider et al. | 382/128 |
| 2003/0099386 A1* | 5/2003 | Schneider et al. | 382/130 |
| 2003/0120171 A1* | 6/2003 | Diamantopoulos et al. | 600/549 |
| 2003/0144598 A1* | 7/2003 | Zhang | G06T 7/0012 600/529 |
| 2005/0152588 A1* | 7/2005 | Yoshida et al. | 382/128 |
| 2005/0209519 A1* | 9/2005 | Krishnan et al. | 600/437 |
| 2005/0259854 A1* | 11/2005 | Arimura et al. | 382/130 |
| 2006/0120591 A1* | 6/2006 | Cathier et al. | 382/154 |
| 2006/0134605 A1* | 6/2006 | Folkman et al. | 435/4 |
| 2006/0258943 A1* | 11/2006 | Ogawa et al. | 600/485 |
| 2007/0019846 A1* | 1/2007 | Bullitt et al. | 382/128 |
| 2008/0033302 A1 | 2/2008 | Grady et al. | |
| 2008/0058633 A1* | 3/2008 | Boyden et al. | 600/407 |
| 2008/0118127 A1 | 5/2008 | Sirohey et al. | |
| 2008/0300797 A1* | 12/2008 | Tabibiazar et al. | 702/19 |
| 2009/0067568 A1* | 3/2009 | Hall | G06T 7/0012 378/4 |
| 2009/0214097 A1* | 8/2009 | Mohamed et al. | 382/131 |
| 2009/0274352 A1* | 11/2009 | Chang et al. | 382/130 |
| 2009/0279758 A1* | 11/2009 | Dikici | G06T 7/0081 382/128 |
| 2010/0074494 A1* | 3/2010 | Karmonik | A61B 5/055 382/131 |
| 2010/0256990 A1* | 10/2010 | Horiguchi | A61B 5/0002 705/3 |
| 2010/0284587 A1* | 11/2010 | Malek et al. | 382/128 |
| 2010/0322525 A1* | 12/2010 | Kohli et al. | 382/226 |
| 2011/0009741 A1* | 1/2011 | Matthews et al. | 600/425 |
| 2011/0014636 A1* | 1/2011 | Koike | G01N 33/57426 435/7.23 |
| 2011/0037761 A1* | 2/2011 | Mistretta et al. | 345/419 |
| 2011/0229005 A1* | 9/2011 | Den Harder et al. | 382/131 |
| 2011/0257537 A1* | 10/2011 | Alatriste | 600/485 |
| 2011/0274323 A1* | 11/2011 | Klingenbeck | 382/128 |
| 2012/0321169 A1* | 12/2012 | Baloch et al. | 382/133 |
| 2012/0323547 A1* | 12/2012 | Baloch et al. | 703/11 |
| 2013/0058555 A1* | 3/2013 | Miao et al. | 382/132 |
| 2013/0064438 A1* | 3/2013 | Taylor | A61B 5/02007 382/130 |
| 2013/0157347 A1* | 6/2013 | Topol | G01N 33/5026 435/287.2 |
| 2013/0231257 A1* | 9/2013 | Rainger et al. | 506/9 |
| 2014/0228668 A1* | 8/2014 | Wakizaka et al. | 600/407 |
| 2014/0247970 A1* | 9/2014 | Taylor | A61B 5/02007 382/128 |
| 2015/0044239 A1* | 2/2015 | Lifton et al. | 424/184.1 |

OTHER PUBLICATIONS

Steinman et al. "Image-Based Computational Simulation of Flow Dynamics in a Giant Intracranial Aneurysm" AJNR Am J Neuroradiol 24:559-566, Apr. 2003, pp. 1-8.*

Lehman et al. "Assessment of Coronary Plaque Progression in Coronary CT Angiography Using a Semi-Quantitative Score" JACC Cardiovasc Imaging. Nov. 2009; 2(11): 1262-1270. doi:10.1016/j.jcmg.2009.07.007; pp. 1-17.*

Li et al., "Selective enhancement filters for nodules, vessels, and airway walls in-two and thee-dimensional CT Scans", Medical Physics, vol. 30, No. 8, Aug. 2003, 12 pages.

Zhou et al., "Efficient Skeletonization of Volumetric Objects", IEEE Transactions on Visualization and Computer Graphics, vol. 5, No. 3, Jul.-Sep. 1999, 14 Pages.

Kakeda et al., "Diagnostic Accuracy and Reading Time to Detect Intracranial Aneurysms on MR Angiography Using a Computer-Aided Diagnosis System", AJR:190, Feb. 2008, pp. 459-465.

Uchiyama et al., "Computer-Aided Diagnosis Scheme for Detection of Unruptured Intracranial Aneurysms in MR Angiography", Proceedings of the 2005 IEEE Engineering in Medicine and Biology 27th Annual Conference, Shanghai, China, Sep. 1-4, 2005, 4 pages.

Yang et al., "Computer-Aided Detection (CAD) on Intracranial Aneurysms in MR Angiography", http://www.siim2009.org/abstracts/SS3_Yang/SS3_Yang.html, SiiM, 2009, 3 pages.

Kobashi et ai., "Computer-Aided Diagnosis of Intracranial Aneurysms in MRA Images with Case-Based Reasoning", The Institute of Electronics, Information and Communication Engineeers Trans. Inf. & Syst., vol. E89-D, No. 1 Jan. 2006, 12 pages.

Hayashi et al., "Feasibility of a Curvature-based Enhanced Display System for Detecting Cerebral Aneurysms in MR Angiography", Magnetic Resonance in Medical Scientces, vol. 2., No. 1, 2003, pp. 29-36.

Arimura et al., Automated Computerized Scheme for Detection of Unruptured Intracranial Aneurysms in Three-Dimensional Magnetic Resonance Angiography, Academic Radiology, vol. 11, No. 10, Oct. 2004, 12 pages.

Notification of Transmittal of the International Search Report and Written Opinion of the International Searching Authority, or the Declaration for corresponding application No. PCT/US2010/042055, mailed Oct. 15, 2010, 19 pages.

Notification Concerning Transmittal of International Preliminary Report on Patentability (Chapter I of the Patent Cooperation Treaty) for corresponding application No. PCT/US2010/042055, mailed Jan. 26, 2012, 11 pages.

* cited by examiner

COMPUTER-AIDED DETECTION (CAD) OF INTRACRANIAL ANEURYSMS

CROSS REFERENCE TO RELATED APPLICATIONS

This application claims the benefit of U.S. Provisional Application No. 61/225,701, filed Jul. 15, 2009, which is incorporated herein by reference in its entirety.

TECHNICAL FIELD

The disclosure relates generally to computer detection of intracranial aneurysms in 3D medical image data.

BACKGROUND

Intracranial aneurysms represent a difficult to detect cause of morbidity and mortality. Detecting intracranial aneurysms is very important in preventing severe morbidity or death. Although digital subtraction angiography (DSA), which is an invasive method, is considered the gold standard in detecting intracranial aneurysms, non-invasive 3D time-of-flight magnetic resonance angiography (hereinafter referred to as MRA) is often used as a screening tool because it is less costly and present less risk to the patient.

A typical MRA dataset usually contains more than 100 images, making it very time-consuming for radiologists to review the dataset and determine whether any aneurysms are present. Furthermore, small aneurysms are often likely to be missed by radiologists using current analysis methods such as reviewing maximum intensity projection (MIP) images. This is because adjacent vessels or unusual locations may be overlapped on MIP images of MRA. With MIPs, even for experienced radiologists, the sensitivity to small (<5 mm) aneurysms in MRA images is only in the range of 35 to 60%.

SUMMARY

The disclosure relates generally to a system and/or method that identifies suspected aneurysms from 3D image datasets, such as MRA, Computed Tomography Angiography (CTA), etc. The system takes raw image dataset as input and assigns points of interest (POIs) in the image data. The system calculates one or more features for each POI and identifies aneurysm suspects from among the assigned POIs based on the calculated features.

In one example, the disclosure is directed to a method comprising assigning points of interest (POIs) on blood vessels within an image of a subject based on defined characteristics that may be associated with an aneurysm, calculating one or more features of each POI, and identifying one or more aneurysm suspects based on the calculated features. Identifying features may include at least one of calculating a distance from the POI to a center line, calculating a radius of the vessel at a nearest point in the centerline or at a surface of the vessel, calculating a planeness of the vessel at the POI, calculating a cylinder surfaceness of the vessel, calculating Gaussian and mean curvatures of the vessel at the POI, and calculating a shape index (SI) at the POI.

In another example, the disclosure is directed to a method comprising assigning points of interest (POIs) on blood vessels within an image of a subject based on defined characteristics that may be associated with an aneurysm, calculating one or more features of each POI, identifying one or more aneurysm suspects based on the calculated features.

In another example, the disclosure is directed to a method comprising assigning points of interest (POIs) on blood vessels within an image dataset of a subject based on defined characteristics that may be associated with an aneurysm, for each assigned POI, calculating one or more features that may be indicative of the presence of an aneurysm, generating a list of aneurysm suspects from among the assigned POIs based on whether the one or more features for each assigned POI satisfy one or more threshold values, assigning a probability score to each aneurysm suspect, ranking the aneurysm suspects based on the probability score assigned to each aneurysm suspect, and displaying the list of aneurysm suspects and the probability score assigned to each aneurysm suspect.

The details of one or more examples are set forth in the accompanying drawings and the description below. Other features and advantages will be apparent from the description and drawings, and from the claims.

DETAILED DESCRIPTION

The disclosure relates generally to computer systems and/or methods that automatically identify aneurysm suspects from 3D image datasets. The system takes a raw image dataset as input and assigns points of interest (POIs) in the image data. The POIs may be assigned using one or more techniques as described herein. The system may calculate one or more features for each POI and identify one or more suspicious POIs from among the set of assigned POIs based on the calculated features. A reduced set of suspicious POIs may be chosen by applying a series of sieving rules. Each remaining suspicious POI may be assigned a probability score, indicating the likelihood of it representing a true aneurysm. The suspicious POIs may be ranked in descending order of probability. Clusters of suspicious POIs may be combined to eliminate overlapping detections. The remaining suspicious POIs may be used to generate a list of aneurysm suspects. The aneurysm suspects may be presented to a radiologist or other user in, for example, descending order of probability score. The user may then review the list of aneurysm suspects and use their judgment to determine which aneurysm suspects are likely to be true aneurysms.

While generally one or more POIs will be assigned and a list of one or more aneurysm suspects will be generated, it is also possible that in some examples no POIs may be assigned. In such an example, the aneurysm suspect identification system may indicate that no aneurysm suspects were found. It is also possible that one or more POIs may be assigned, but that none of them satisfy the criteria for them to be identified as aneurysm suspects. In such an example, the aneurysm suspect identification system may indicate that no aneurysm suspects were found. Thus, although the present description may refer generally to assigning of one or more POIs or identification of one or more aneurysm suspects, it shall be understood that no POIs may be assigned and/or that no aneurysm suspects may be identified, and that the invention is not limited in this respect.

For purposes of the present description, an example implementation in which 3D image datasets are obtained via 3D time-of-flight (TOF) magnetic resonance angiography (MRA) will be described. However, it shall be understood that the acquisition could either be direct 3D, or could be multiple 2D images acquired in a way that permits creation of a 3D image set, such as computed tomography (CT), that allows visualization of blood vessels within the body, or any other imaging technique, and that the disclosure is not limited in this respect.

In addition, although the present description will refer generally to the identification of intracranial aneurysm suspects, it shall be understood that the system and methods described herein may also be used for identification of aneurysm suspects in other areas of the body, including but not limited to the aortic aneurysm suspects, aneurysm suspects in the legs, or aneurysm suspects in any other area of the body.

The aneurysm suspect identification may assist users in detecting aneurysms from 3D image datasets by outputting a list of one or more aneurysm suspects. This list may then be reviewed by the radiologist or other user, who may then use their judgment while reading the MRA dataset to determine whether any of the aneurysm suspects is likely to be a true aneurysm. The system may reduce the time associated with reading the MRA dataset. The system may also increase sensitivity to small aneurysms on the MRA image. The aneurysm suspect identification thus takes an MRA (or other medical imaging) dataset as input, highlights suspicious regions (e.g., displays a list of one or more aneurysm suspects), and allows the radiologist to make decisions according to their scrutiny. The system may include an intuitive 3D view to display the suspicious regions, as well as the related detail quantified data on the intracranial vessels. The system may further provide navigational tools that permit a user to navigate between the findings and the locations in the raw data.

The system automatically identifies aneurysm suspects from 3D image datasets. Although in some examples the term "automatically" means that there is no human intervention before the system displays the resulting list of aneurysm suspect locations within the MRA data set, other example systems that are not fully automatic in the sense that they may acquire human input before or during the suspect aneurysm identification process are also within the scope of the present disclosure.

Intracranial aneurysms can have a variety of shapes, and may be categorized into three types based on morphology: saccular (a berry or sac-like outpouching in a cerebral blood vessel), bifurcation (those occurring at a bifurcation of a blood vessel) and fusiform (cylindrically-shaped). Aneurysms may also be classified according to size, e.g., big or small (5 mm diameter is a common breakpoint). One or more features of each of type of aneurysm may be used to detect potentially suspicious points of interest (POIs) in a 3D image dataset.

Figure 1:
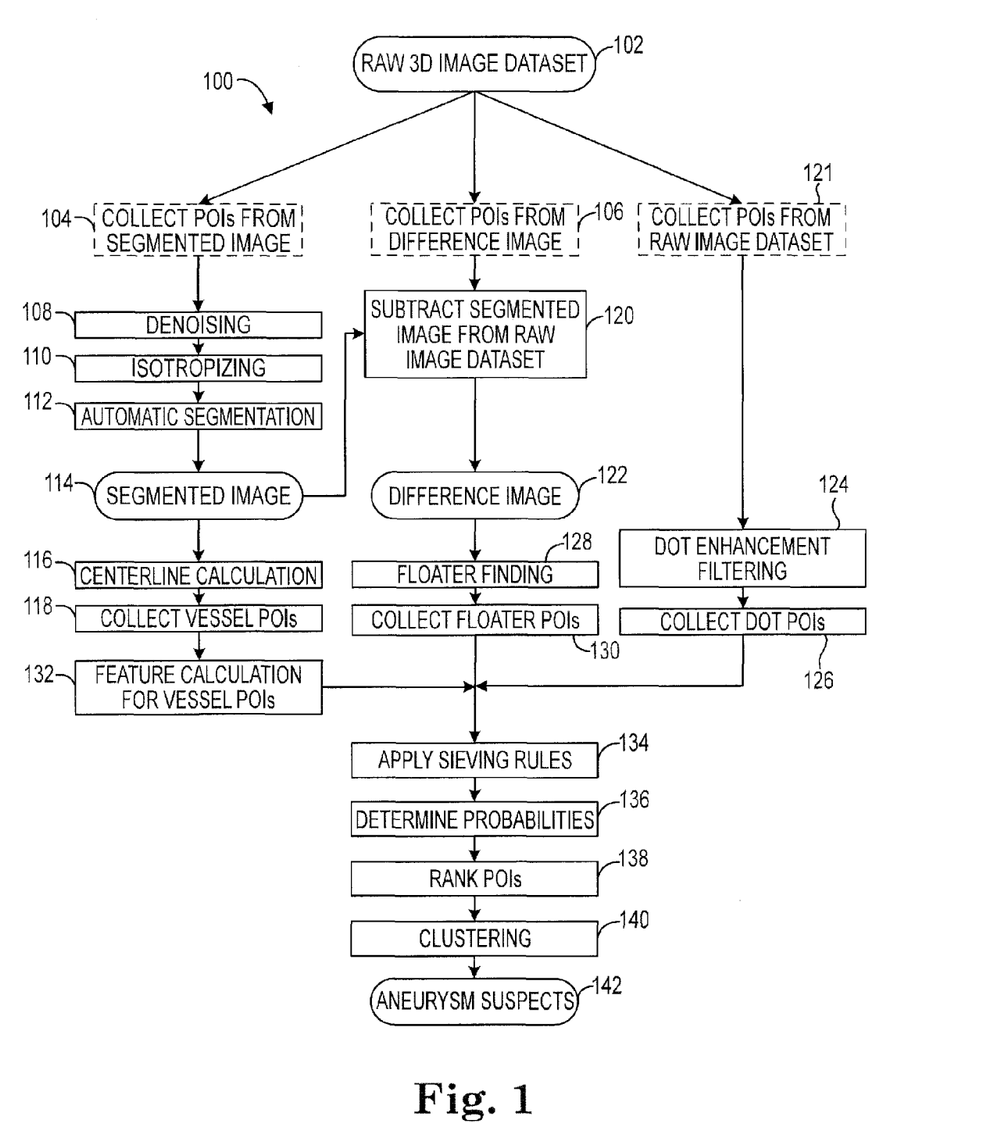
FIG. 1 is a flowchart illustrating the process 100 by which the system 200 identifies aneurysm suspects.

FIG. 1 is a flowchart illustrating the process 100 by which the system 200 (shown in more detail in FIG. 10) may identify aneurysm suspects. To assign POIs, the system analyzes two types of images: a segmented image (104) and a difference image (106). POIs detected via segmentation are referred to herein as vessel POIs. POIs detected via a difference image are referred to as dot or floater POIs (e.g., 126, 130).

Figure 2A:
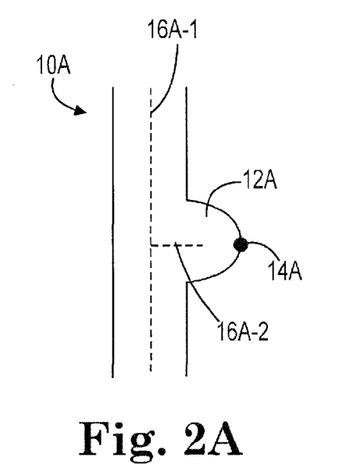
FIGS. 2A-2D are diagrams illustrating examples of four types of vessel POIs.
Figure 2B:
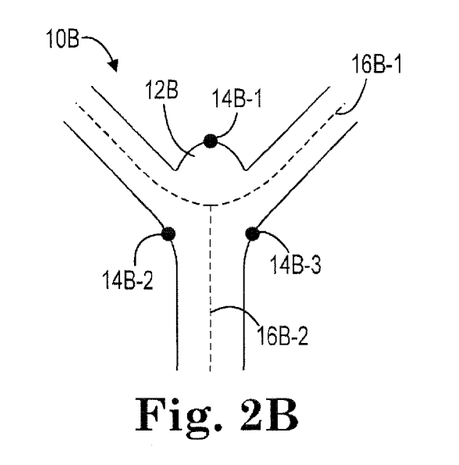
Figure 2C:
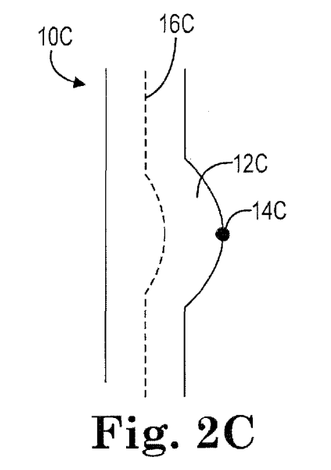
Figure 2D:
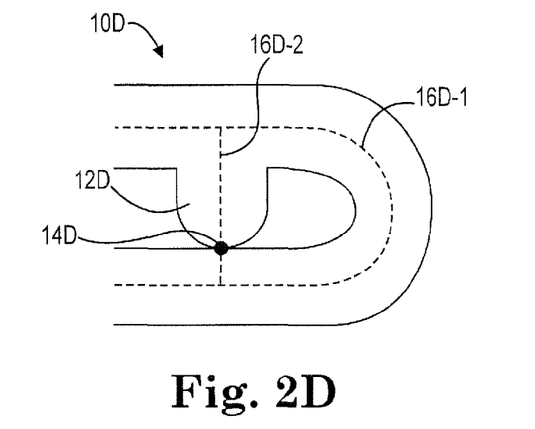

FIGS. 2A-2D are diagrams illustrating examples of four types of vessel POIs. FIG. 2A illustrates an example vessel 10A having a short branch POI 14A. FIG. 2B illustrates an example vessel 10B having a bifurcation POI 14B-1. FIG. 2C illustrates an example vessel 10C having a local maximum POI 14C. FIG. 2D illustrates an example vessel 10D having a cyclic short trunk POI 14D. A short branch POI is a surface point at which the extension of a short trunk intersects the vessel surface; a bifurcation POI is a surface point around a vessel bifurcation at which the extension of a bifurcation trunk intersects the vessel surface; a local maximum POI is a point on the vessel surface near which the radii of the vessel increase abnormally; a cyclic short trunk POI is a representative point on a trunk abnormally short-circuited a long trunk. In this example, the representative point was chosen as the one at which the vessel was thinnest.

Referring again to FIG. 1, vessel POIs are assigned from a segmented image (104). The system segments the vessels from the raw image and assigns the POIs from the segmented vessels. To generate the segmented image, a filter may be applied to the raw 3D MRA data set to denoise the images (108). The resulting 3D MRA data set may be scaled to an isotropic dimension (110).

An automatic segmentation algorithm is applied (112), resulting in a binary 3D image set containing segmented arterial vessels (114). On example automatic segmentation of brain vessels from a 3D MRA data set is based on a global thresholding and region growing scheme. This example segmentation method includes finding a "best" threshold and a series of seed points automatically that initiate the region growing algorithm. The segmentation algorithm generates one single or multiple separate 3D regions, each of which represents a group of connected artery vessels. The POI detection procedure may then be applied to each of these 3D regions. Other segmentation techniques known in the art may also be applied, and the disclosure is not limited in this respect.

After the segmented image is obtained (114), for each slice in the binary 3D image set, the contours of the vessels are found, and for the whole binary 3D image set, the centerline of the vessels is determined (116). For example, for each of the 3D regions, internal holes may be mended based on the contours found in each slice. Then the centerlines of the 3D region may be calculated. For example, the centerlines of the 3D regions may be determined using a 3D thinning algorithm, such as that described in Ta-Chih Lee, et al. Building Skeleton Models via 3-D Medial Surface/Axis Thinning Algorithms, *CVGIP: Graphical Models and Image Processing*. v. 56 n. 6, p. 462-478, November 1994. Other techiques for determining the centerline of the vessels may also be applied, and the disclosure is not limited in this respect.

POIs on the segmented vessel surfaces that are candidates for aneurysms are assigned (118). The candidate POIs are assigned based on various defined characteristics that may be associated with an aneurysm or that are likely locations for an aneurysm. For example, referring again to FIG. 2A, a POI 14A may be assigned when a vessel 10A includes a main centerline 16A-1 and a branch centerline 16A-2, and when the distance between the POI 14A and main centerline 16A-1 satisfies a minimum threshold distance. Referring to FIG. 2B, POIs 14B-1, 14B-2 and 14B-3 may be assigned when a vessel 10B includes a bifurcation as indicated by centerlines 16B-2 and 16B-1. In FIG. 2C, a POI 14C may be assigned when a vessel 10C includes a centerline 16C having a radius of curvature that satisfies a threshold value. In FIG. 2D, a POI 14D may be assigned when a vessel 10D (such as the carotid siphon) includes a main centerline 16D-1 and a branch centerline 16D-2 that completes a loop with main centerline 16D-1 (such as shown in FIG. 2D) or when the distance from POI 14D to centerline 16D-1 satisfies a minimum threshold distance. Note that the POIs 14A, 14B-1, 14C, and 14D are assigned to the distal-most point away from the relevant center line in these examples. Also note that in FIG. 2B, POIs 14B-2 and 14B-3 may be assigned as a matter of course at all bifurcations in an image data set. Also, a POI 14B-1 may also be assigned even if there were no bulging of the blood vessel at that point.

Each POI 14A, 14B-1, 14C and 14D shown in FIGS. 2A-2D include a bulging (indicated by reference numerals 12A-12D, respectively) of the respective blood vessel 10A-10D. These POIs and the associated bulging of the blood vessels may or may not eventually satisfy the conditions to be identified as an aneurysm suspect. For those POIs that are identified as aneurysm suspects, some or all of these may, upon review by the radiologist, be determined not to be a true aneurysm. However, it shall be understood that POIs are not assigned based upon whether an aneurysm is actually present. Rather, the POIs are assigned based on defined characteristics that may be associated with an aneurysm, or based on locations or vessel types where aneurysms are likely to occur (such as bifurcations). For example, all bifurcations in the 3D image data will be associated with three POIs such as those indicated in FIG. 2B, regardless of whether an aneurysm is present or not. When assigning POIs, the system is making a first pass at identifying those areas of interest that may be analyzed in more detail to determine whether the POI should be identified as an aneurysm suspect. Therefore, when initially assigning POIs (118), the system of this example takes a relatively inclusive approach. The initial group of assigned POIs is later reduced as described below to a list of one or more aneurysm suspects as described below.

To find the locations where POIs should be assigned, the raster representation of all the 3D thinning vessels are transformed into a list of vector representations called trunks. Along each trunk the radius of the vessel at center points are calculated. Trunk-level features, like length, minimum radius, maximum radius, average radius, etc., may also be calculated for every trunk.

One or more of the four types of vessel POIs shown in FIGS. 2A-2D may then be identified. Among these four example types of vessel POIs, the first three (FIGS. 2A-2C) come from the surface of vessels, and the last one (FIG. 2D) comes from the center line of the vessels. Each of these vessel-type POIs may be assigned based on one or more features of the trunks. Alternatively or in addition, a single point seeded distance transformation algorithm may also be used to find more local maximum POIs, such as described in Yong Zhou, et al. Efficient Skeletonization of Volumetric Objects, *IEEE Transactions on Visualization and Computer Graphics.* v. 5, n. 3, p. 196-209, July 1999. Other techniques may also be used, and the disclosure is not limited in this respect One or more features for each of the assigned vessel POIs are then calculated (132). Example features may include one or more of the following: the type of POI; the position of the POI within the cranial space; the distance from the POI to the trunk; the radius of the vessel; the planeness of the vessel; the cylinder surfaceness of the vessel; the Gaussian and mean curvatures of the vessel surface; the shape index (SI) of the vessel surface; and/or any other feature that may be used to describe the vessel at the POI.

Figure 6:
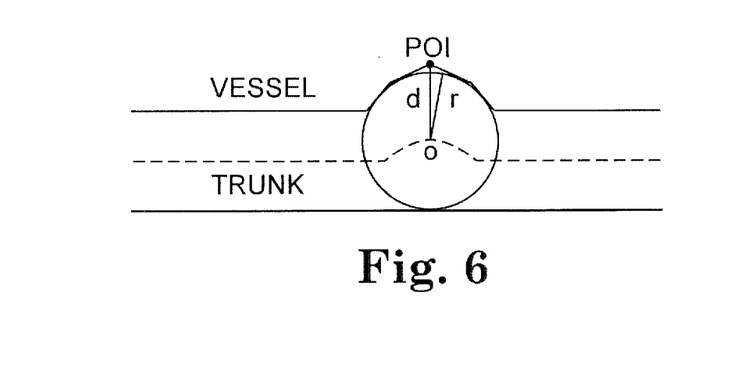
FIG. 6 is a diagram illustrating example vessel features, distance to the trunk (d) and radius of the vessel (r).

For example, the distance from the POI to the trunk may be determined as the Euclidian distance from a POI point to the trunk, denoted as d in FIG. 6, for example. The radius of the vessel, denoted as r in the example of FIG. 6, may be determined at the nearest point in the trunk, denoted as O, for example.

Figure 7:
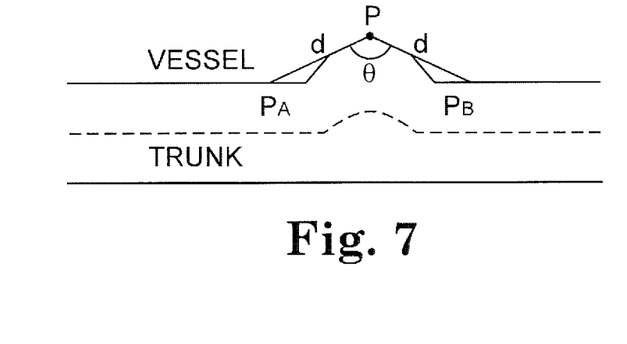
FIG. 7 is a diagram illustrating an example vessel feature, planeness.

The planeness of the vessel surface may be determined using the parameters shown in FIG. 7, for example. Suppose P is a POI point. T is a point set that contains those points at the vessel surface whose Euclidian distance to P is d, the distance to the trunk. The planeness of the vessel at POI point P may be defined as:

$$\text{planeness}(P) = \min_{P_A, P_B \in T} \cos(\overrightarrow{PP_A}, \overrightarrow{PP_B}).$$

Figure 8:
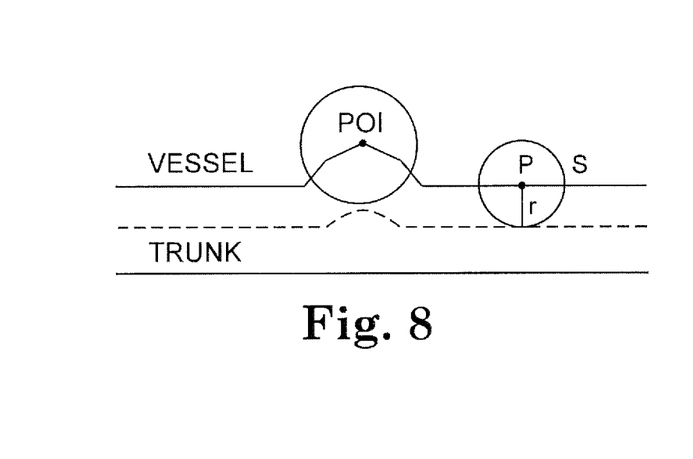
FIG. 8 is a diagram illustrating an example vessel feature, cylinder surfaceness.

The cylinder surfaceness (CS) of a vessel may be determined using the parameters shown in FIG. 8, for example. Suppose P is a point in a cylinder of radius r and infinite length, and S is a sphere of radius r centered at P. The CS at P is defined as:

$$CS = \frac{V_{overlap}}{V_{sphere}} = \frac{1}{2} + \frac{1}{\pi} \int_{\pi/3}^{\pi/2} (1 + 2\cos 2\theta)^{\frac{3}{2}} d\theta \stackrel{\Delta}{=} CSC \approx 0.4021,$$

where $V_{sphere}$ is is the volume of sphere S and $V_{overlap}$ is the volume of the overlapped part of vessel and sphere S. For any point on the cylinder, its CS is a constant CSC, independent of radius r. However, if P is at a swelling surface of the cylinder, like the example POI in FIG. 8, its CS will be less than 1.

Figure 9:
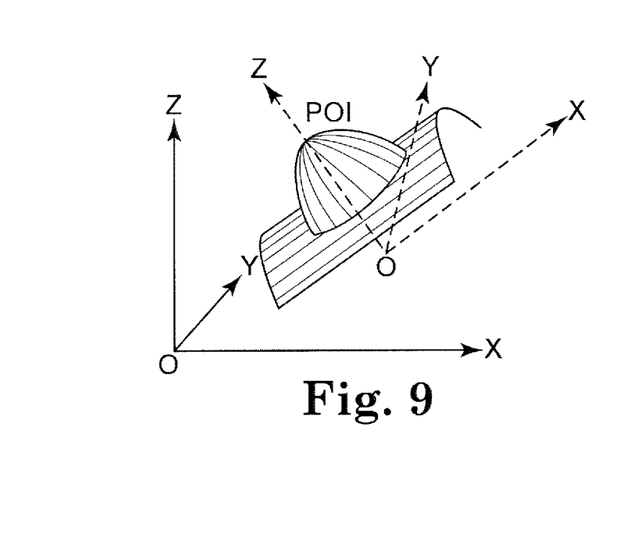
FIG. 9 is a diagram illustrating an example vessel feature, shape index.

The Gaussian curvature and mean curvatures of a vessel may be determined using the parameters shown in FIG. 9, for example. Gaussian curvature (K) and mean curvatures (H) of a vessel surface at a POI may be calculated by fitting a quadratic surface to the vessel surface around the POI. As shown in FIG. 9, for example, the coordinate system is transformed from XYZ to X'Y'Z', whose origin O' is the trunk point nearest to POI, and whose Z' axis is in the direction of O'-POI. A quadratic surface $$z = ax^2 + by^2 + cxy + dx + ey + f$$

may be fit to the local vessel surface around the POI, where any points on the vessel surface with distance not greater than the vessel radius at O' are considered to be local vessel surface. In this way, K and H may be calculated as:

$$K = \frac{4ab - c^2}{(1 + d^2 + e^2)^{3/2}}, H = \frac{a(1 + e^2) - cde + b(1 + d^2)}{(1 + d^2 + e^2)^{3/2}}.$$

The shape index (SI) of a vessel may be determined based on the aforementioned quadratic surface fitting, for the Gaussian curvature (K) and mean curvature (H) as follows:

$$k_1 = H + \sqrt{H^2 - K}, k_2 = H - \sqrt{H^2 - K},$$

$$SI = \frac{1}{2} - \frac{1}{\pi} \arctan \frac{k_1 + k_2}{k_1 - k_2},$$

where k1 and k2 are two principal curvatures. Note that 0<SI<1, and the nearer SI is to 1, the more likely a POI locates on the surface of a sphere.

Other features may include intensity (indicative of blood flow in MRA); volume and shape of the connected region grown from the difference image and initiated from one of the neighbor points that has the maximum intensity (to eliminate FPs at the origin of very small blood vessels), etc.

Although an example list of features is described above, it shall be understood that other features that may prove useful in removing false positives from the assigned vessel POIs may also be used, and that the disclosure is not limited in this respect.

To determine which features may be used for each POI (132) and how these features should be applied, the system may make use of a machine learning algorithm. A training data set(s) may include a plurality of image data sets in which the locations of aneurysms have been positively identified (e.g., manually and/or via DSA). The machine learning algorithm analyzes the training data set(s) and automatically learns to recognize patterns associated with known aneurysms. In so doing, the machine learning algorithm may determine what features to analyze, how they should be analyzed, which features are relevant to which type of POI, the combinations of features relevant to each type of POI, their relative weights, how to classify or group the features or POIs, etc. Once the system is trained on the training data set(s), the system may make intelligent decisions when analyzing new image data set(s). For example, the system may assign POIs, reduce the number of false positives, classify POIs by type, classify by likelihood (probability) of an aneurysm or make other intelligent decisions based on the information learned during the machine learning phase.

In some examples, the training data set(s) may be taken from a diversified population, which may result in a set of POI features, classifications, and/or analysis techniques directed to the general population. In other examples, the training data set(s) may be taken from a specific population, thus resulting in a set of POI features, classifications, and/or analysis techniques directed to that specific population. For example, persons with polycystic kidney disease are known to be predisposed to certain types of brain aneurysms, and a focused, population-specific training set(s) may aid in identifying brain aneurysms in that population. In other examples, training set(s) taken from populations grouped by age, race, nationality, gender, genetic profile, etc. could also be generated to provide population specific identification of aneurysm suspects.

Alternatively, a heuristic approach to feature calculation may be taken in which various features are tuned manually until a desired correlation with known aneurysm data set(s) is obtained.

POIs may also be assigned from a difference image (106). In that case, the system assigns POIs directly from the unsegmented regions in the raw image. A difference image (122) may be obtained by subtracting the segmented vessel image from the raw image dataset (120). The POIs are then assigned from the difference image. The POIs assigned in this way may include dot POIs and floater POIs. Alternatively, dot POIs and/or floater POIs may be obtained from the raw image data.

Figure 3:
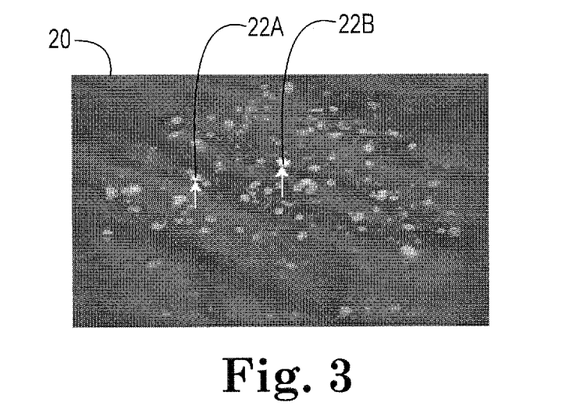
FIG. 3 is a MRA image of example dot POIs.
Figure 4:
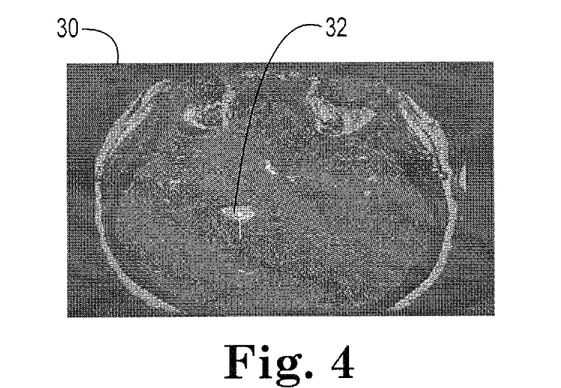
FIG. 4 is a MRA image of an example floater POI.

FIG. 3 is a MRA image 20 of example dot POIs 22A and 22B. FIG. 3 is a MRA image 30 of an example floater POI 32. Assignment of dot and floater POIs may help to identify those areas of interest where there is not much blood flow in a vessel, and consequently which may not be as easily visualized within the segmented image.

Dot POIs may be assigned by applying a dot enhancement filter to the difference image (124) or to the raw image data. For example, a multiscale 3D dot enhancement filter may be applied to the raw image, resulting in a dotness image and a scale image with maximum responses. The dotness image may be normalized by the scale image on a voxel basis, resulting in a new image that we called the dotness companion image:

$$\text{dotness companion image} = \frac{\text{dotness image}}{\text{scale image}}.$$

For each MRA case, 4 dot POIs (or other appropriate number) may be collected. This may be done as follows: find the point(s) in the dotness companion image with the maximum intensity; perform region growing from that point, with its intensity as the threshold; collect the center point of each resulting 3D region as a dot POI. If the number of dot POIs was less than 4, decrease the threshold by 0.1 and collected all those points with intensity not less than the current threshold as new seeds, and performed region growing again. This may be repeated until we found at least 4 dot POIs (or other appropriate number). The brightest dots from the filtered image are assigned as dot POIs (126).

Floater POIs may be assigned by applying a floater finding algorithm to the difference image (128) or to the raw image data and identifying abnormally large regions in the difference image (130). When finding floater POIs from a difference image, the floater POIs may be collected by finding abnormal 2D regions in the difference image, and then checking the volume and dimension of the corresponding 3D regions. For example, a 2D region in the difference image may be considered abnormal if the area of that region (based on the intensity threshold found before) was greater than the expected average area of the crossing section of intracranial vessels, which may be set, for example, to $\pi r^2$, where r=2 mm. Starting from the center of the 2D abnormal region and the intensity threshold, the region growing algorithm may be run to get the 3D abnormal region. If the volume of the 3D region exceeds one-eighth the volume of the surrounding cubic (or other appropriate threshold), we may collect the center of the 3D region as a floater POI.

Referring again to FIG. 1, one or more sieving strategies may be applied to the assigned vessel, dot and/or floater POIs to remove false positives (FPs) that satisfy one or more sieving rules (134). Among the assigned POIs, it is possible that at least some should not be identified as suspicious POIs, but may rather represent curves in the vessel, bifurcations, or other false positive.

To sieve suspicious POIs from the list of all assigned POIs, a series of empirically determined sieving rules based on the calculated features may be applied. For each type of POI, specific features may be determined and used in the analysis of identifying aneurysm suspects. For example, POI type and position (e.g., position within the cranial space) features may be features determined for all types of POIs. In some examples, for vessel POIs of the type shown in FIG. 2D and dot POIs, type and position may be the only features determined. In some examples, for floater POIs, the dimension of the originating 3D region may be determined. In some examples, for vessel POIs of the types shown in FIGS. 2A-2C, one or more of the following features may be determined as discussed in more detail above: the type of POI; the position of the POI within the cranial space; the distance from the POI to the trunk; the radius of the vessel; the planeness of the vessel; the cylinder surfaceness of the vessel; the Gaussian and mean curvatures of the vessel surface; the shape index (SI) of the vessel surface; and/or any other feature that may be used to describe the vessel at the POI.

Once the relevant features are determined, one or more of the following sieving rules may be applied to each of the assigned POIs:

For any POI, if the position of the POI is located too low (below ⅛ of total image height) or too high (above ⅞ of total image height), remove it;

If a POI has a small radius of vessel (less than 1 mm), remove it;

If a local maximum POI locates in a vertically low position (below the ⅔ of total image height) and near a leaf trunk, remove it;

If a vessel POI is near a long trunk (longer than 4 times the maximum radius of the trunk), and the planeness is less than −0.9 (−0.8 for local maximum POI), remove it;

For a local maximum or bifurcation vessel POI, define a tolerance function of radius r:

$$\lambda(r) = \begin{cases} 0.88 + 0.028*(r-1), & \text{for } r \geq 1 \text{ mm and } r \leq 3.5 \text{ mm} \\ 0.95, & \text{for } r > 3.5 \text{ mm} \end{cases}.$$

If cylinder surfaceness CS satisfies CS/CSC>λ(r), remove it;

For a local maximum or bifurcation vessel POI, if K and H does not satisfy H<0 and K>0 (in other words, keep elliptical concave points, see HK classification rule in Table 1), remove it;

TABLE 1

HK Classification

| | K < 0 | K = 0 | K > 0 |
|---|---|---|---|
| H < 0 | Hyperbolic concave | Cylindrical concave | Elliptical concave |
| H = 0 | Hyperbolic symmetric | Planner | Impossible |
| H > 0 | Hyperbolic convex | Cylindrical convex | Elliptical convex |

For a local maximum or bifurcation vessel POI, if SI<0.99, remove it;

For a floater POI, if it is located too far from the center (beyond the cubic region centered at the image center and sized ¾ of the raw image in each dimension, for example), remove it;

For a dot POI, if it is located within the segmented image, remove it.

It shall be understood that the sieving threshold values listed above are exemplary only, and that other sieving thresholds may be used, and that the disclosure is not limited in this respect. It shall also be understood that the example sieving rules described above are examples only, and that one or more other sieving rules could also be applied, and that the disclosure is not limited in this respect.

As mentioned above, the sieving rules and thresholds applied during application of the sieving rules may be determined based on one or more training data sets, via a heuristic approach, or via other method. The training data sets may be population-specific or may be taken from a diversified population.

A probability value that represents the likelihood of an aneurysm may be assigned to each of the remaining POIs (136). This probability value may range, for example, from 0 to 1, with 0 being a low likelihood of an aneurysm and 1 being a high likelihood of an aneurysm. The probability may also be expressed as a percent, on a scale of 1 to 100 (or any other scale) and/or by other method of indicating probability.

For example, for vessel POIs of the types shown in FIGS. 2A-2C, the probability may be calculated based on one or more of the following four parameters, each of which except the last one is measured in mm:

s: size of the aneurysm suspect

For example, the size of the aneurysm suspect may be estimated as $$s = \max_{1 \leq \sigma \leq r} (2/|H(\sigma)|),$$

where H(σ) is the mean curvature calculated based on different scale σ.

$d_t$: distance to the trunk r: radius of the vessel $d_c$: distance to the center of image, normalized by the distance from any corner of the 3D image to the center of the image.

The probability p of POI may then be calculated as $$p = \frac{p_{adjust}}{1 + d_c^2},$$

and constrain p≤1,
where
$p_{adjust} = s_{adj} r_{adj} d_{adj}$;
$s_{adj} = s/4 + 1/6$, and constrain $s_{adj} \leq 1$;
$r_{adj} = (3r+11)/21$, and constrain $r_{adj} \leq 1$;
$d_{adj} = d_t/r$.

For all other type of POIs, the probability may be determined based $d_c$ only, for example. In those example(s), $p_{adjust}$ may be set to 1, and the same probability formula given above may be used to determine the probability for those types of POIs.

Although specific parameters and equations for determining probability are described above, it shall be understood that these are examples only. Other parameters may be taken into account during determination of probability, and other equations for determining probability may be applied, and the disclosure is not limited in this respect.

The remaining POIs may then be ranked (138) according to their probability value. A clustering algorithm may be applied to combine POIs that are likely to represent a single aneurysm into a single 'hit' (140). For example, POIs that are within a defined threshold distance of each other may be defined as representing a single aneurysm. The system then outputs one or more aneurysm suspects (142). (Or if no aneurysm suspects were identified, the system would indicate such). This output of aneurysm suspects may be represented, for example, by a translated point set, which contains the middle points of the remaining POIs and their nearest points in the centerline.

When generating the final set of aneurysm suspects, the system may apply probability thresholds to the assigned POIs. For example, those POIs having a probability above a probability threshold may be identified as aneurysm suspects. The probability threshold, if used, may be pre-programmed or user-selected. As another example, the n highest ranking POIs may be identified as aneurysm suspects, where n, if used, may be pre-programmed or user-selected.

Table 1 shows experimental results. 288 MRA studies were identified in patients who had undergone intracranial DSA to confirm the presence of 1 or more aneurysms. These studies were then annotated by a trained radiologist to identify the aneurysm(s). This person had access to reports and DSA images to increase confidence of findings. A total of 148 ground truth aneurysms have been identified in these MRA datasets, including all the three types (saccular, bifurcation, and fusiform), and with the minimum size 2 mm and maximum size 33 mm.

The algorithm was executed on each of the 288 cases, the number of true positives (TPs) were computed as were those where POIs were within 10 mm of the annotated aneurysm location. False positives (FPs) were all the POIs more than 10 mm from the annotation. Since the purpose of the annotation was to highlight suspected regions for purpose of visualization of that region by a radiologist, exact location may not be required. As long as it is close enough to be in the visualized region may be sufficient, for example.

Figure 10:
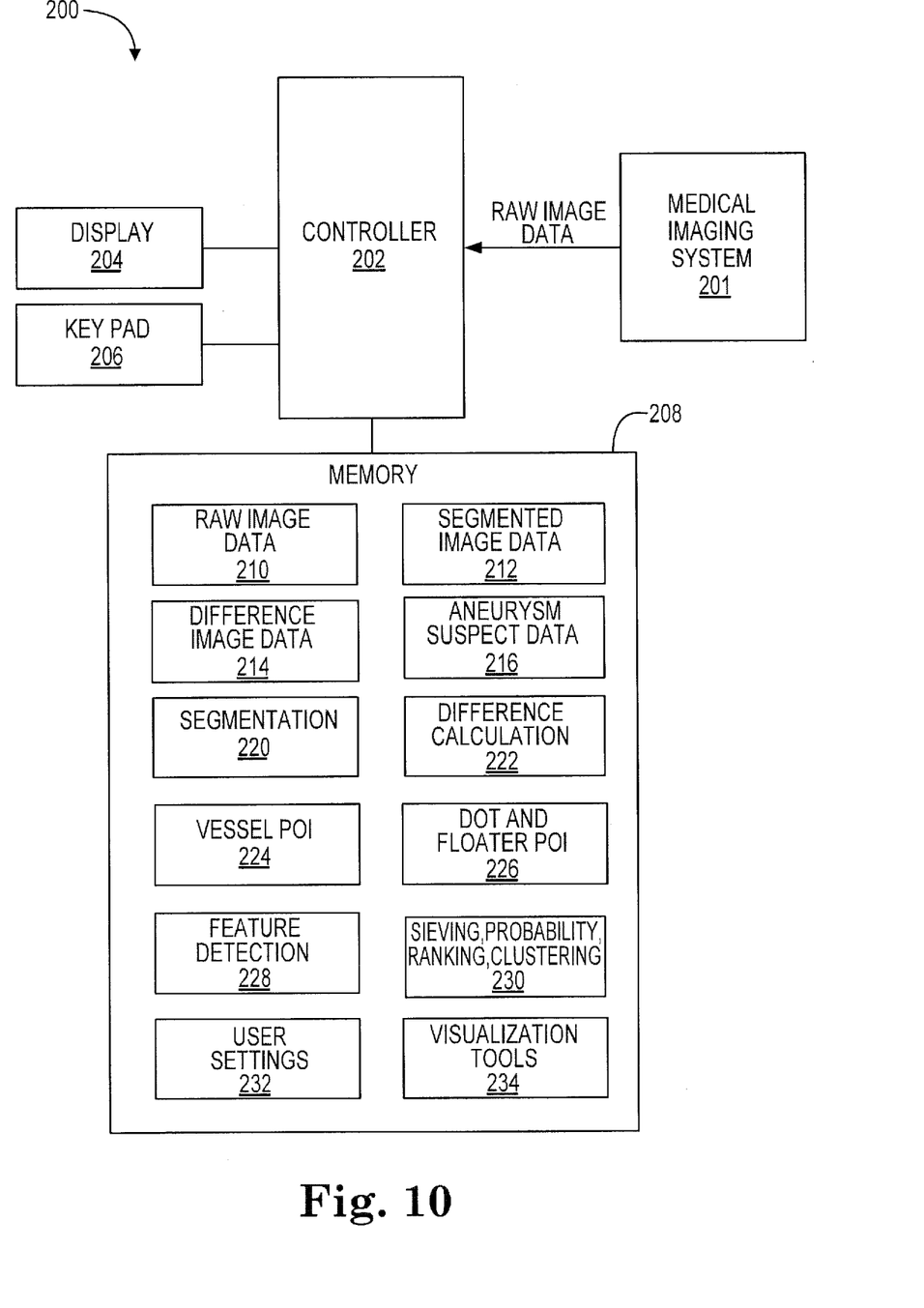
FIG. 10 is a block diagram illustrating an example aneurysm suspect identification system 200.

In the test, when no limit was set to the output, a total of 142 aneurysms were successfully detected automatically. A limit to the output numbers may be set, which may both decrease the sensitivity and FPs per case. As shown in Table 1, if the maximum output number is limited to 13, for example, the result is a sensitivity of 95% and average FPs of 9.06 per examination. If the maximum output number is limited to 8, for example, the result is a sensitivity of 90% and average FPs of 6.46 per examination.

example, memory 202 may store raw image data 210; segmented image data 212 (see FIG. 1, ref num. 114); difference image data 214 (see FIG. 1, ref. num. 122); and aneurysm suspect data 216. Memory may also store a segmentation module 220 that calculates the segmented image; a difference calculation module 222 that calculates the difference image; a vessel POI assignment module 224 that assigns vessel POIs; a dot and floater POI assignment module 226 that assigns dot and floater POIs; a feature detection module 228 that analyzes features of assigned POIs to obtain a reduced list of POIs; and a sieving, probability, ranking, and clustering module 230 that generates the final list of one or more aneurysm suspects. Memory 208 may also store user settings 232 and visualization tools 234.

User settings 232 allow the user to define or customize a variety of user adjustable settings for viewing and interacting with the list of one or more aneurysm suspects and the 3D image data. For example, the user may select by probability score, e.g., choosing to view only those POIs having a probability score that is higher than a user-selected probability score. As another example, the user may select by rank, thus choosing to view only the highest ranking aneurysm suspects (e.g., those with the highest probability of an aneurysm) and/or a user-selected number of top ranked aneurysm suspects, such as the top 5, 10, 15 (or some other user-selected number). The user may also choose to view all of the identified aneurysm suspects. As another example, the user may select by classification, thus choosing to view the selected

TABLE 1

Part of the TP-FP Table of the experiment with respect to 288 MRA studies*

| Max # of Output for each case | TP # | FP # | FP #/TotalCase | FP #/TotalFP | TP #/TotalTP | TP #/TotalGT |
|---|---|---|---|---|---|---|
| 1 | 55 | 232 | 0.81 | 0.07 | 0.39 | 0.37 |
| 2 | 86 | 466 | 1.62 | 0.14 | 0.61 | 0.58 |
| 3 | 106 | 713 | 2.48 | 0.21 | 0.75 | 0.72 |
| 4 | 117 | 950 | 3.30 | 0.28 | 0.82 | 0.79 |
| 5 | 121 | 1200 | 4.17 | 0.36 | 0.85 | 0.82 |
| 6 | 129 | 1428 | 4.96 | 0.43 | 0.91 | 0.87 |
| 7 | 130 | 1650 | 5.73 | 0.49 | 0.92 | 0.88 |
| 8 | 133 | 1861 | 6.46 | 0.56 | 0.94 | 0.90 |
| 9 | 136 | 2049 | 7.11 | 0.61 | 0.96 | 0.92 |
| 10 | 137 | 2217 | 7.70 | 0.66 | 0.96 | 0.93 |
| 11 | 138 | 2364 | 8.21 | 0.71 | 0.97 | 0.93 |
| 12 | 139 | 2494 | 8.66 | 0.75 | 0.98 | 0.94 |
| 13 | 140 | 2608 | 9.06 | 0.78 | 0.99 | 0.95 |

*In this table, TotalCase = 288, TotalFP = 3335, TotalTP = 142, TotalGT (total ground truth) = 148.

Figure 5:
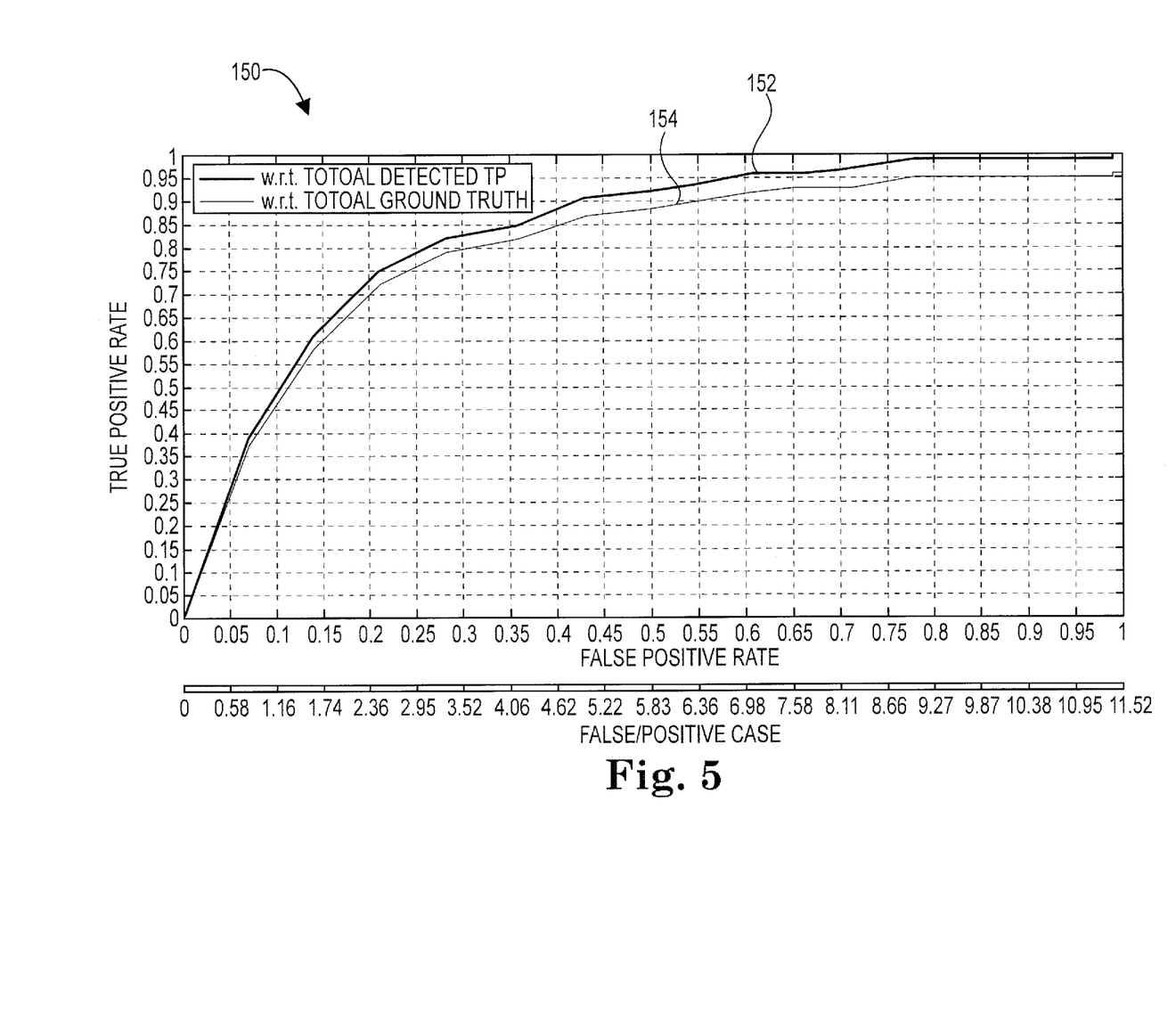
FIG. 5 shows experimental results of the system on a known data set.

The fROC of the experiment result is given in FIG. 5. The false positive (FP) rate is on the X axis and the true positive (TP) rate is on the Y axis. Curve 152 is with respect to total detected TPs, and curve 154 is with respect to total ground truth TPs. The ROC area of the two curves are 0.83 and 0.79, respectively. This experiments shows that the aneurysm detection techniques can accurately detect all types of aneurysms of different sizes with and a controllable and acceptable FP rate.

FIG. 10 is a block diagram illustrating an example aneurysm suspect identification system 200. System 200 includes a controller 202 that receives the raw image data from an associated medical imaging system 201, such a magnetic resonance imaging (MRI) system, a computed tomography (CT) system, etc.). A user interface includes a display 204 and keyboard or key pad 206.

A memory 208 stores the various types of data and software modules used or generated by controller 202. For type(s) (classification(s)) of aneurysm suspects. As another example, the user may also select by location (e.g., certain region within the intracranial space) or other means of selecting from among a group of identified aneurysm suspects.

The user may also select how the data is to be viewed. For example, the user may be presented with a series of bookmarks, each associated with one of the identified aneurysm suspects, that the user may then scroll through and review. The user may also choose to view the data through maximum intensity projection (MIP) or volume rendering to aid the user's perception in visualizing the relative 3D positions of the identified aneurysm suspects within the intracranial space.

Visualization tools 234 display the identified aneurysm suspects in an intuitive 3D view. For example, by clicking or touching on any of the displayed suspicious regions in the 3D view (either via computer mouse, touch screen, etc.), users can be referred to the corresponding location in the original dataset so that the details may be reviewed. While the system may present false positives, this may be a manageable number (e.g., less than 10 per case) and the user interface may make reviewing the total number of identified aneurysm suspects a relatively more efficient task. As a result, system 200 may save time and increase accuracy for radiologists when reading the angiography images, and thus improve the quality of health care.

One or more of the techniques described herein may be partially or wholly executed in software. For example, a computer-readable medium may store or otherwise comprise computer-readable instructions, i.e., program code that can be executed by a computer or processor to carry out one of more of the techniques described above.

In one example, the aneurysm detection system(s) and/or method(s) may encompass one or more computer-readable media comprising instructions that cause a processor to carry out the methods described above. A "computer-readable medium" includes but is not limited to read-only memory (ROM), random access memory (RAM), non-volatile random access memory (NVRAM), electrically erasable programmable read-only memory (EEPROM), flash memory a magnetic hard drive, a magnetic disk or a magnetic tape, a optical disk or magneto-optic disk, CD, CD-ROM, DVD, a holographic medium, or the like. The instructions may be implemented as one or more software modules, which may be executed by themselves or in combination with other software.

The instructions and the media are not necessarily associated with any particular computer or other apparatus, but may be carried out by various general-purpose or specialized machines. The instructions may be distributed among two or more media and may be executed by two or more machines. The machines may be coupled to one another directly, or may be coupled through a network, such as a local access network (LAN), or a global network such as the Internet. The connections may be wired or wireless.

The aneurysm detection system(s) and/or method(s) may also be embodied as one or more devices that include logic circuitry to carry out the functions or methods as described herein. The logic circuitry may include a processor that may be programmable for a general purpose or may be dedicated, such as microcontroller, a microprocessor, a Digital Signal Processor (DSP), an Application Specific Integrated Circuit (ASIC), a field programmable gate array (FPGA), and the like.

Various examples have been described. These and other examples are within the scope of the following claims.

The invention claimed is:

1. A method, comprising:
   receiving, by a computing device, an image dataset of a subject generated by a medical imaging system;
   assigning, by the computing device, points of interest (POIs) on blood vessels within the image dataset based on defined characteristics that may be associated with an aneurysm;
   for each assigned POI, calculating, by the computing device, one or more features that may be indicative of the presence of an aneurysm;
   generating, by the computing device, a list of aneurysm suspect POIs from among the assigned POIs based on whether the one or more features for each assigned POI satisfy one or more threshold values;
   determining, by the computing device, a probability score for each aneurysm suspect POI, each probability score based on the one or more features calculated for the aneurysm suspect POI and indicative of the relative likelihood that the aneurysm suspect POI represents a true aneurysm;
   ranking, but the computing device, the aneurysm suspect POIs based on the probability score determined for each aneurysm suspect; and
   displaying, on a user interface, a list of aneurysm suspect POIs and the probability score determined for each aneurysm suspect POI.

2. The method of claim 1, wherein displaying the list of aneurysm suspect POIs comprises displaying the list of aneurysm suspect POIs in descending order of probability score.

3. The method of claim 1, wherein, for each of the assigned POIs, calculating one or more features comprises at least one of calculating a distance from the POI to a center line, calculating a radius of the vessel at a nearest point in the centerline or at a surface of the vessel at the POI, calculating a planeness of the vessel at the POI, calculating a cylinder surfaceness of the vessel at the POI, calculating Gaussian and mean curvatures of the vessel at the POI, and calculating a shape index (SI) at the POI.

4. The method of claim 1 wherein the image dataset is generated using one of magnetic resonance angiography or computed tomography.

5. The method of claim 1 wherein generating a list of aneurysm suspect POIs comprises identifying one or more intracranial aneurysm suspects.

6. The method of claim 1, wherein generating a list of aneurysm suspect POIs comprises applying one or more sieving rules to the assigned POIs to remove false positives, wherein the one or more sieving rules compare one or more of the calculated features for each of the assigned POIs with a corresponding one or more sieving threshold values.

7. The method of claim 1 further comprising displaying a list of the aneurysm suspects and the assigned probability score for each of the aneurysm suspects.

8. The method of claim 1, wherein assigning POIs comprises at least one of assigning a POI when a blood vessel includes a main centerline and a branch centerline and a distance between the POI and main centerline satisfies a minimum threshold distance, assigning a POI when a blood vessel includes a bifurcation, assigning a POI when a blood vessel includes a centerline having a radius or curvature that satisfies a threshold value, and assigning a POI when a blood vessel includes a main centerline and a branch centerline that completes a loop with the main centerline.

9. The method of claim 1, wherein calculating one or more features of each POI comprises at least one of calculating a distance from the POI to a center line, calculating a radius of the vessel at a nearest point in the centerline or at a surface of the vessel, calculating a planeness of the vessel at the POI, calculating a cylinder surfaceness of the vessel, calculating Gaussian and mean curvatures of the vessel at the POI, and calculating a shape index (SI) at the POI.

10. The method of claim 1, further comprising receiving at least one user selected setting that allows a user to customize user adjustable settings for viewing and interacting with a list of the aneurysm suspects.

11. The method of claim 10, wherein receiving at least one user selected setting comprises at least one of receiving a user-selected probability score, receiving a user-selected rank, receiving a user-selected aneurysm suspect classification, and receiving a user-selected region within an intracranial space.

12. The method of claim 1, further comprising ranking the aneurysm suspects according to the assigned probability scores.

13. The method of claim 1, further comprising applying a machine learning algorithm to a training data set to determine the features to be calculated.

14. The method of claim 13, further comprising applying the machine learning algorithm to a diversified population training data set.

15. The method of claim 13, further comprising applying the machine learning algorithm to a population-specific training data set.

16. The method of claim 15, further comprising applying the machine learning algorithm to a population-specific training data set taken from a population of subjects with polycystic kidney disease.

17. The method of claim 15, further comprising applying the machine learning algorithm to at least one of a population-specific training data set taken from a population of subjects grouped by at least one of age, race, nationality, gender, or genetic profile.

18. The method of claim 15, wherein identifying whether the POI is an aneurysm suspect comprises identifying whether the POI is an aneurysm suspect based on a population-specific feature analysis.

* * * * *